(12) United States Patent
Dollison et al.

(10) Patent No.: US 9,559,346 B2
(45) Date of Patent: Jan. 31, 2017

(54) TRACTION BATTERY ELECTRICAL JOINT

(71) Applicant: FORD GLOBAL TECHNOLOGIES, LLC, Dearborn, MI (US)

(72) Inventors: Josef Dollison, Petersburg, MI (US); Evan Mascianica, Detroit, MI (US); Jeremy Samborsky, Llvonia, MI (US); Asif Iqbal, Macomb, MI (US); Daniel Miller, Desrborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/736,403

(22) Filed: Jun. 11, 2015

(65) Prior Publication Data

US 2016/0365561 A1   Dec. 15, 2016

(51) Int. Cl.
*H01M 2/10* (2006.01)
*H01M 2/20* (2006.01)

(52) U.S. Cl.
CPC .......... *H01M 2/206* (2013.01); *H01M 2/1083* (2013.01); *H01M 2220/20* (2013.01)

(58) Field of Classification Search
CPC  H01M 2/1077; H01M 2/206; H01M 2220/20; H01M 2/1083
See application file for complete search history.

(56) References Cited

U.S. PATENT DOCUMENTS

| 6,168,470 B1* | 1/2001 | Ikeda ................... H01M 2/206 439/620.08 |
| 8,557,425 B2 | 10/2013 | Ronning et al. |
| 2013/0189560 A1 | 7/2013 | Widhalm |
| 2015/0072195 A1* | 3/2015 | Soleski .................. B60R 16/03 429/90 |
| 2015/0072196 A1* | 3/2015 | Soleski .................. B60R 16/03 429/90 |

FOREIGN PATENT DOCUMENTS

| JP | 2009048965 | 3/2009 |
| JP | 5168266 | 3/2013 |
| JP | 5212086 | 6/2013 |

OTHER PUBLICATIONS

Reineman, Samuel, Design and Analysis of a Battery for a Formula Electric Car, Jun. 2013, pp. 1-41, Massachusetts Institute of Technology.

\* cited by examiner

*Primary Examiner* — Stewart Fraser
(74) *Attorney, Agent, or Firm* — Carlson, Gaskey & Olds, P.C.

(57) ABSTRACT

An exemplary assembly includes an array plate of a traction battery and an insert held by the array plate. The insert is in electrical communication with a bus bar of the traction battery. Another exemplary assembly includes an array plate of a traction battery and a fastening insert recessed within the array plate. The fastening insert is more electrically conductive than the array plate.

20 Claims, 6 Drawing Sheets

TRACTION BATTERY ELECTRICAL JOINT

TECHNICAL FIELD

This disclosure relates generally to an electrical joint associated with a traction battery and, more particularly, to an electrical joint that is housed within an array plate of the traction battery.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The batteries of electrified vehicles can include many electrical joints. Electrical joints can be required to, among other things, transmit power to and from the batteries.

SUMMARY

An assembly according to an exemplary aspect of the present disclosure includes, among other things, an array plate of a traction battery, and an insert held by the array plate. The insert is in electrical communication with a bus bar of the traction battery.

In a further non-limiting embodiment of the foregoing assembly, the assembly includes a fastener that engages the insert to secure a portion of the bus bar relative to the array plate.

In a further non-limiting embodiment of any of the foregoing assemblies, the fastener further engages the insert to secure an electric cable connector to the traction battery.

In a further non-limiting embodiment of any of the foregoing assemblies, the fastener threadably engages the insert.

In a further non-limiting embodiment of any of the foregoing assemblies, a portion of the bus bar and an electric cable connector are weldably attached to the insert.

In a further non-limiting embodiment of any of the foregoing assemblies, the array plate comprises a non-conductive material, and the insert comprises a metallic material.

In a further non-limiting embodiment of any of the foregoing assemblies, a portion of the insert protrudes from an outwardly facing surface of the array plate.

In a further non-limiting embodiment of any of the foregoing assemblies, the outwardly facing surface is an upwardly facing surface.

In a further non-limiting embodiment of any of the foregoing assemblies, the insert is in-molded with the array plate.

In a further non-limiting embodiment of any of the foregoing assemblies, the array plate is an endplate.

An assembly according to an exemplary aspect of the present disclosure includes, among other things, an array plate of a traction battery, and a fastening insert recessed within the array plate. The fastening insert is more electrically conductive than the array plate.

In a further non-limiting embodiment of the foregoing assembly, the fastening insert is in electrical communication with a bus bar of the traction battery.

In a further non-limiting embodiment of any of the foregoing assemblies, the array plate electrically insulates the insert.

In a further non-limiting embodiment of any of the foregoing assemblies, the array plate is a non-conductive material.

In a further non-limiting embodiment of any of the foregoing assemblies, the assembly includes a fastener that engages the fastening insert to secure an electrical cable to a bus bar of the traction battery.

A method according to an exemplary aspect of the present disclosure includes, among other things, electrically coupling to a traction battery array through an insert that is held within an array plate.

In a further non-limiting embodiment of the foregoing method, the method includes engaging a fastener with the insert to secure an electrical cable relative to the traction battery array.

In a further non-limiting embodiment of any of the foregoing methods, the array plate is conductive and the insert is nominally non-conductive.

In a further non-limiting embodiment of any of the foregoing methods, the insert protrudes from an outwardly facing surface of the array plate.

In a further non-limiting embodiment of any of the foregoing methods, insert is in electrical communication with a bus bar of the traction battery array.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to electrical joints that are associated with a traction battery of an electrified vehicle. Generally, electrical joints couple one electrifiable component to another electrifiable component. In electrified vehicles, electrical joints can be used for electrically coupling the traction battery.

More particularly, the disclosure relates to an electrical joint that includes an insert held by an array plate of the traction battery. The insert is in electrical communication with a bus bar of the traction battery. The electrical joint and array plate require less packaging space than prior art arrangements.

Figure 1:
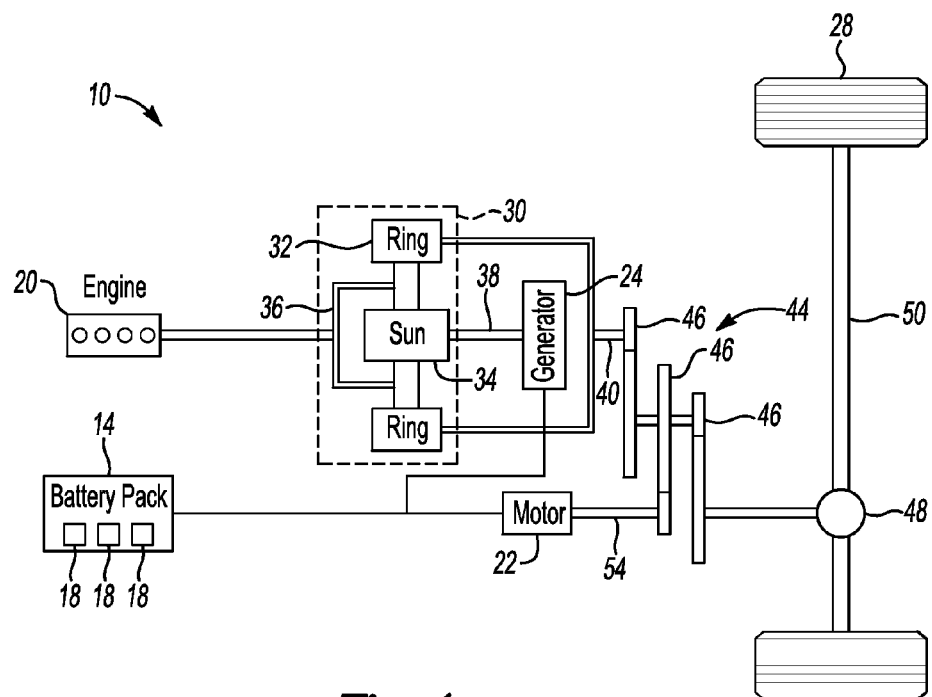
FIG. 1 shows a highly schematic view of a powertrain of an example electrified vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 can be separate, or can have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
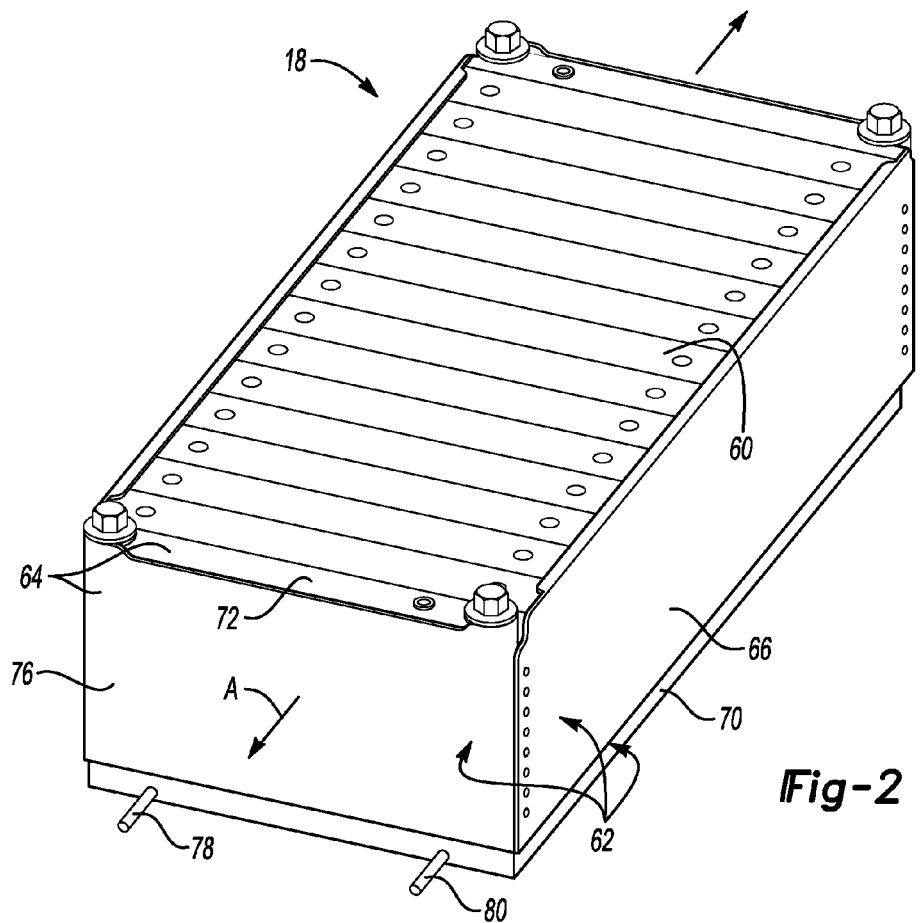
FIG. 2 shows a perspective schematic view of a portion of an array from a battery pack of the powertrain of FIG. 1 with a bus bar assembly removed to reveal battery cells of the array.
Figure 3:
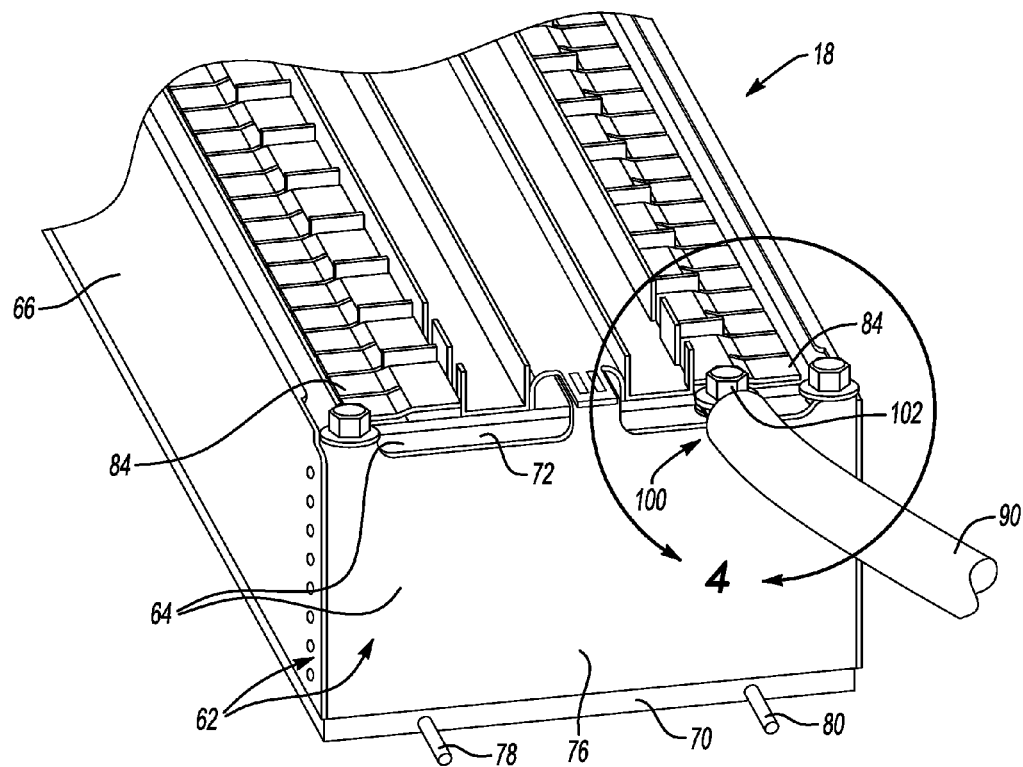
FIG. 3 shows a perspective view of a portion of the array of from the battery pack of FIG. 1.
Figure 4:
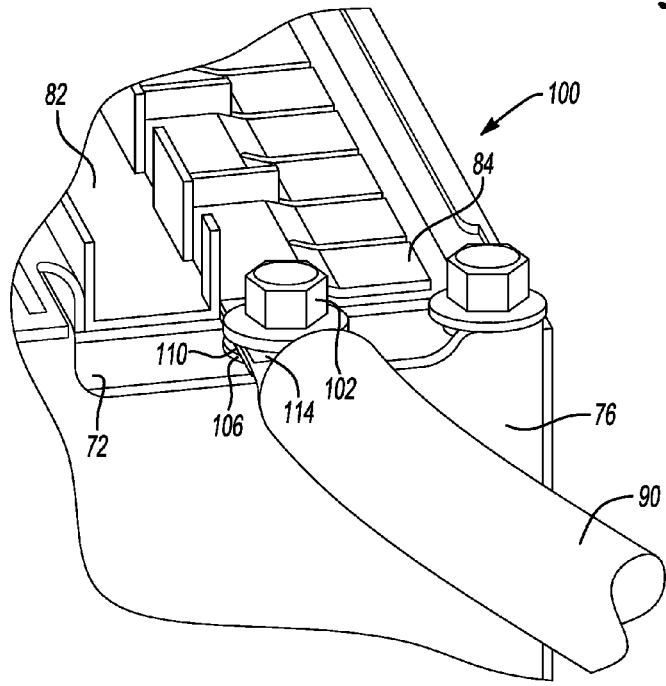
FIG. 4 shows a close-up view of Area 4 in FIG. 3.
Figure 5:
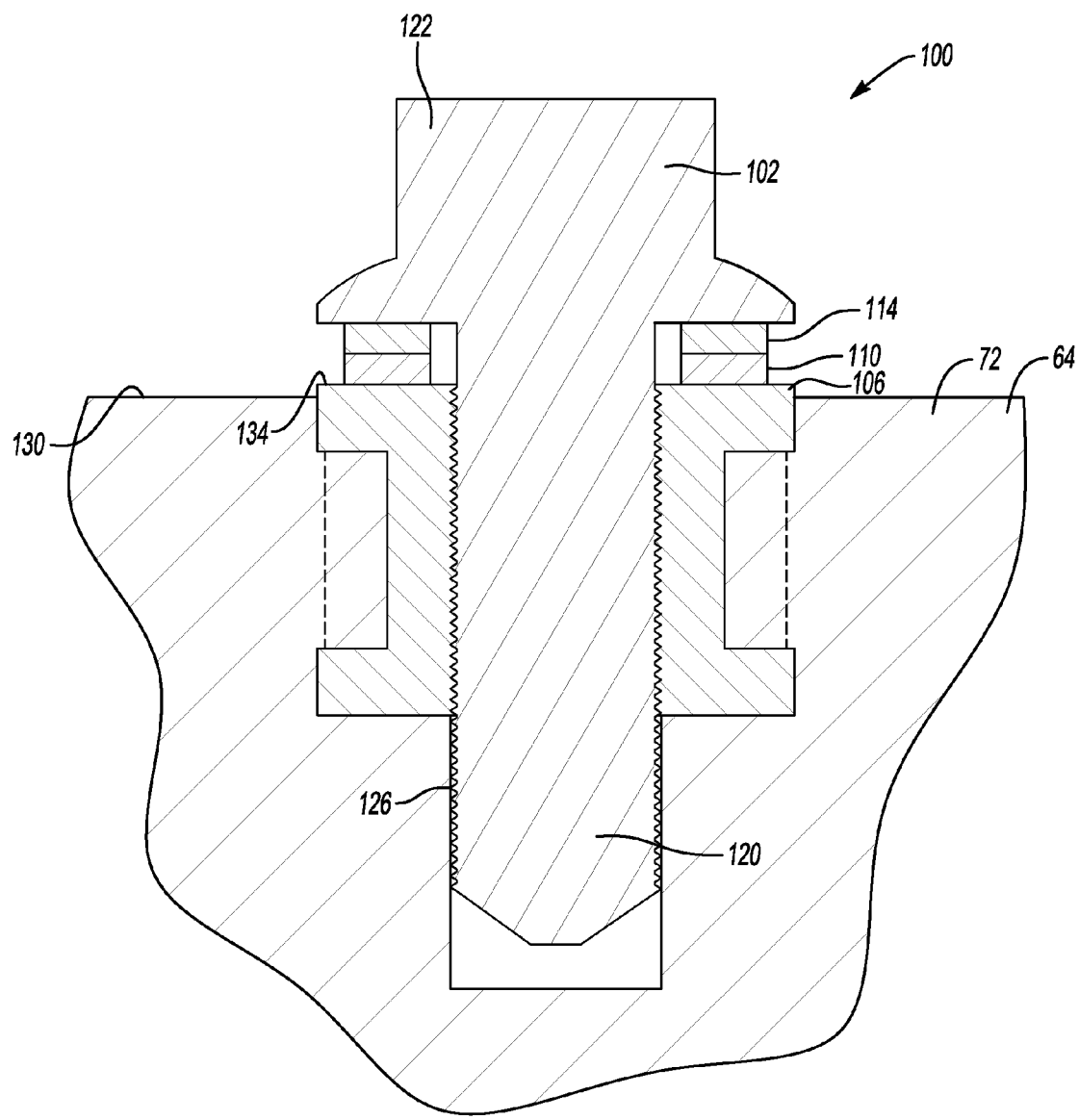
FIG. 5 shows a section view at Area 4.
Figure 6:
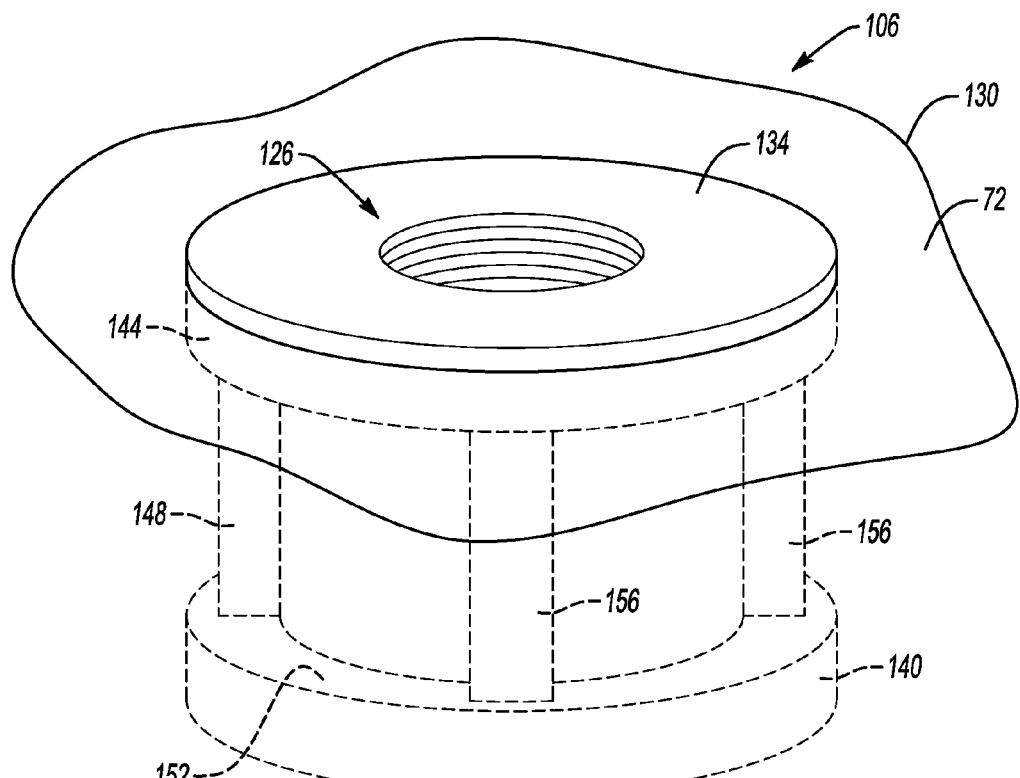
FIG. 6 shows a close-up view of an insert within an inner endplate of the array.
Figure 7:
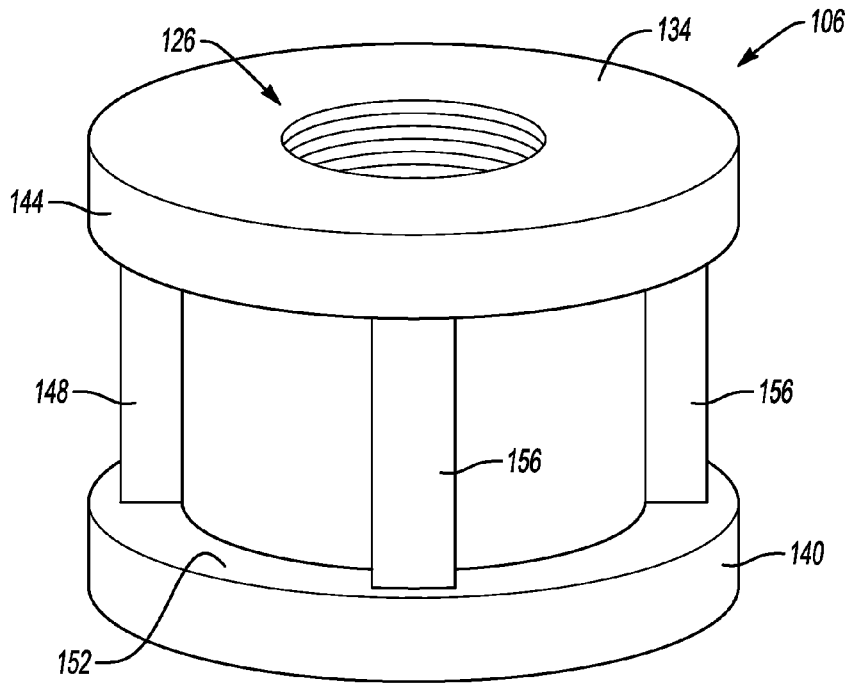
FIG. 7 shows a close-up view of the insert.
Figure 8:
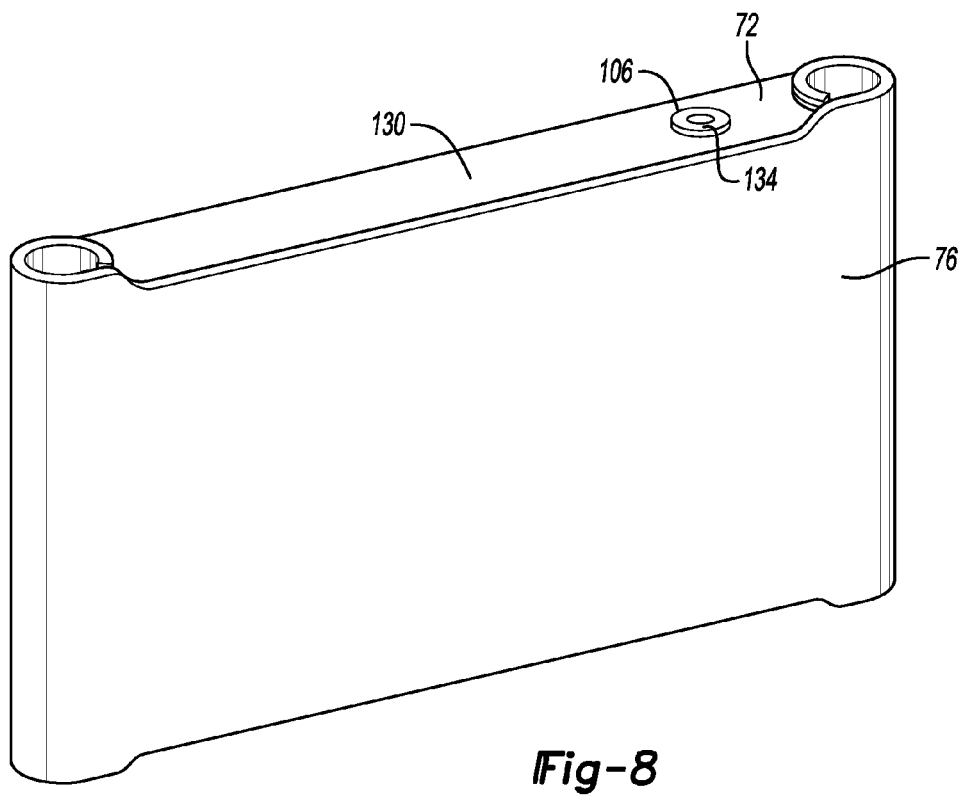
FIG. 8 shows a perspective view of an endplate assembly from the array of FIG. 3.

Referring now to FIGS. 2 and 3 with continuing reference to FIG. 1, each array 18 includes a plurality of battery cells 60 disposed along an axis A. The arrays 18 hold the battery cells 60 with array plates 62. The array plates 62 include, in this example, endplate assemblies 64, sideplate assemblies 66, and a heat exchanger plate 70. Other types of array plates 62 could be used in other examples.

The example endplate assemblies 64 include an inner endplate 72 and an outer endplate 76. The inner endplate 72 separates the outer endplate 76 from the battery cells 60 to, among other things, electrically isolate conductive surfaces of the outer endplate 76 from the battery cells 60. The example inner endplate 72 is primarily a material that is nominally non-conductive, such as a plastic composite or a polymer like a glass reinforced nylon. The outer endplate 76 is a metallic material. The outer endplate 76 is thus more electrically conductive than the inner endplate 72.

Opposing axial ends of the sideplate assemblies 66 are secured to the outer endplates 76 of the endplate assemblies 64. The sideplate assemblies 66 are welded to the outer endplates 76 in this example.

The example array 18 is cooled via liquid coolant communicated through the heat exchanger plate 70. Liquid coolant moves through an inlet 78 to a coolant path established within the heat exchanger plate 70. The liquid coolant moves through the coolant path to exchange thermal energy with the cells 60 and other portions of the array 18. The liquid coolant exits from the heat exchanger plate 70 at an outlet 80.

The liquid coolant is used to cool the cells 60 in this example. In another example, the liquid coolant could be used to heat the cells 60.

Although the example cells 60 are shown as liquid cooled, the cells 60 can be air cooled in other examples.

A bus bar assembly 82 includes a plurality of individual bus bars 84. Terminals 86 of the battery cells are secured to the bus bars 84 to transmit electric power between the battery cells 60 and the bus bars 84. The terminals 86 can be welded to the bus bars 84, for example. The bus bar assembly 82 assembly has been removed in FIG. 2 to show the battery cells 60.

An electric cable 90 is electrically coupled to the array 18 to transmit electric power to and from the array 18. The electric power can be used to for example, drive an electric machine, such as the motor 22 of the powertrain 10.

Referring now to FIGS. 4 to 8 with continuing reference to FIGS. 2 and 3, an electrical joint 100 is used to electrically couple the cable 90 to the array 18. The example electrical joint 100 includes a fastener 102 that engages an insert 106 held within the inner endplate 72 of the endplate assembly 64. The insert 106 can be considered a fastening insert due to the insert 106 being engageable with the fastener 102.

The electrical joint 100 further includes a bus bar flange 110 from the bus bar assembly 82, and a cable connector 114 from the cable 90. The bus bar flange 110 and cable connector 114 each include an aperture to receive the fastener 102. The engagement of the fastener 102 with the insert 106 clamps together the bus bar flange 110 from the bus bar assembly 82 and the cable connector 114 from the cable 90. The bus bar flange 110 is in electric communication with the bus bars 84.

The fastener 102, the insert 106, the bus bar flange 110, and the cable connector 114 are made of a conductive material, such as a metallic material. When the fastener 102 engages the insert 106, and clamps the bus bar flange 110 and the cable connector 114, the electrical joint 100, which includes the insert 106, is electrified together with the bus bars 84 of the bus bar assembly 82.

The example inner endplate 72 is, as previously described, primarily a non-conductive material. The inner endplate 72 is nominally, electrically isolates the electrical joint 100 from other portions of the array 18. No separate shielding structure is required in this example.

The fastener 102 is a threaded bolt in this example. The fastener 102 threadably connects to the insert 106 to engage the insert 106. A torque tool can be used to turn the fastener 102 relative to the insert 106 to cause the fastener 102 to engage the insert 106.

The fastener 102 includes a shaft 120 extending from a head 122. The inner endplate 72 and the insert 106 provides a bore 126 that receives the shaft 120 of the fastener 102.

Notably, the electrical joint 100 has a relatively low profile when compared to electrical joints of the prior art. In prior art designs, a threaded rod extending upwardly from an array provided an attachment point for an electrical joint.

In the electrical joint 100, the shaft 120 and the insert 106 are largely contained within the inner endplate 72 below an upwardly facing surface 130 of the inner endplate 72. Thus, the packaging size required for the electrical joint 100 is reduced when compared to the electrical joints of the prior art, which had a threaded rod extending upwards a significant distance upwardly from the array 18.

The insert 106 includes a contact surface 134 to contact the bus bar flange 110. In another example, the bus bar flange 110 is stacked on the cable connector 114, and the contact surface 134 directly contacts with the electrical connector 114 rather than the bus bar flange 110.

Although the insert 106 is recessed within the inner endplate 72, the contact surface 134 is spaced vertically from the upwardly facing surface 130 of the inner endplate 72. The insert 106 is thus proud to the inner endplate 72 and protrudes from the upwardly facing surface 130. Positioning the insert 106 within the inner endplate 72 such that the insert 106 protrudes from the surrounding surface of the inner endplate 72 ensures that the surface 134 of the insert 106 can fully interface with the bus bar flange 110 or the electrical connector 114.

Because the example insert 106 protrudes from the inner endplate 72, the fastener 122 will not contact the surface 130 of the inner endplate 72 prior to the fastener 122 fully engaging the insert 106. If the insert 106 were flush or subflush the upwardly facing surface 130, the head 122 could potentially hang up on the inner endplate 72, which could inhibit clamping the electrical connector 114 and the bus bar flange 110.

The example insert 106 is in-molded within the inner endplate 72. That is, the insert 106 is placed into a mold during manufacturing of the inner endplate 72. A relatively soft polymer material of the inner endplate 72 is then introduced to the mold and flows around the insert 106. The material of the inner endplate 72 hardens within the mold. The hardened material holds the position of the insert 106.

The insert 106 can includes features to secure the insert 106 within the inner endplate 72. For example, the insert 106 includes a first circumferential flange 140, a second circumferential flange 144, and a plurality of radially extending flanges 148 extending from the first circumferential flange 140 to the second circumferential flange 144.

The first circumferential flange 140 provides the insert 106 with an anti-withdrawal feature. Material of the inner endplate 72 contacts a surface 152 of the first circumferential flange 140 to resist withdrawal of the insert 106 from the inner endplate 72 when, for example, the fastener 122 is engaging the insert 106.

The radially extending flanges 148 provide an anti-spinning feature. The circumferentially facing surfaces 156 of the radially extending flanges 148 contact material of the inner endplate 72 to resist rotation of the insert 106 relative to the inner endplate 72.

The example insert 106 has a cylindrical design, but could have many other geometries.

Figure 9:
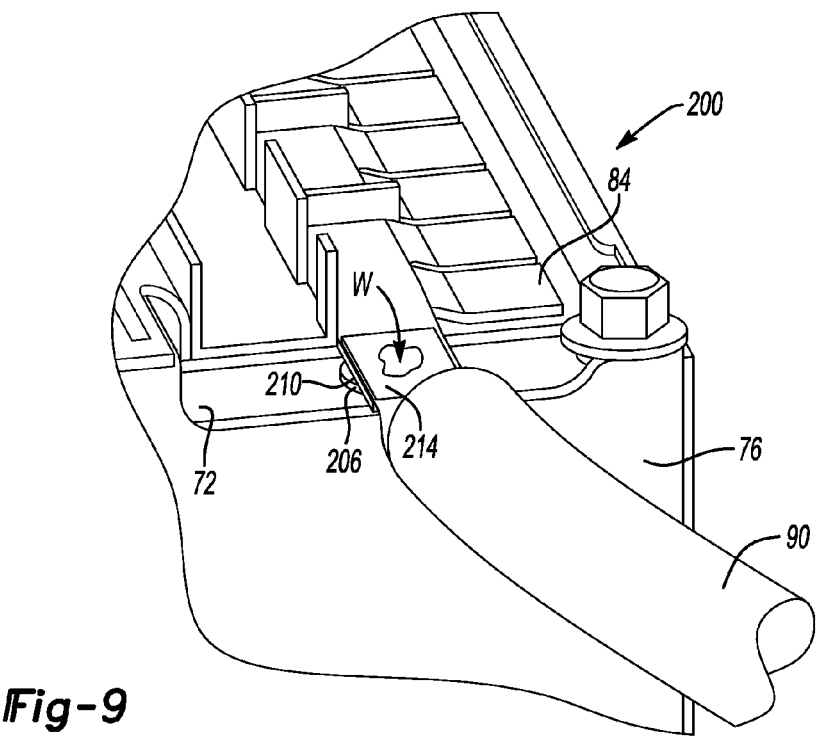
FIG. 9 shows a close-up view of Area 4 in FIG. 3 according to another exemplary embodiment.
Figure 10:
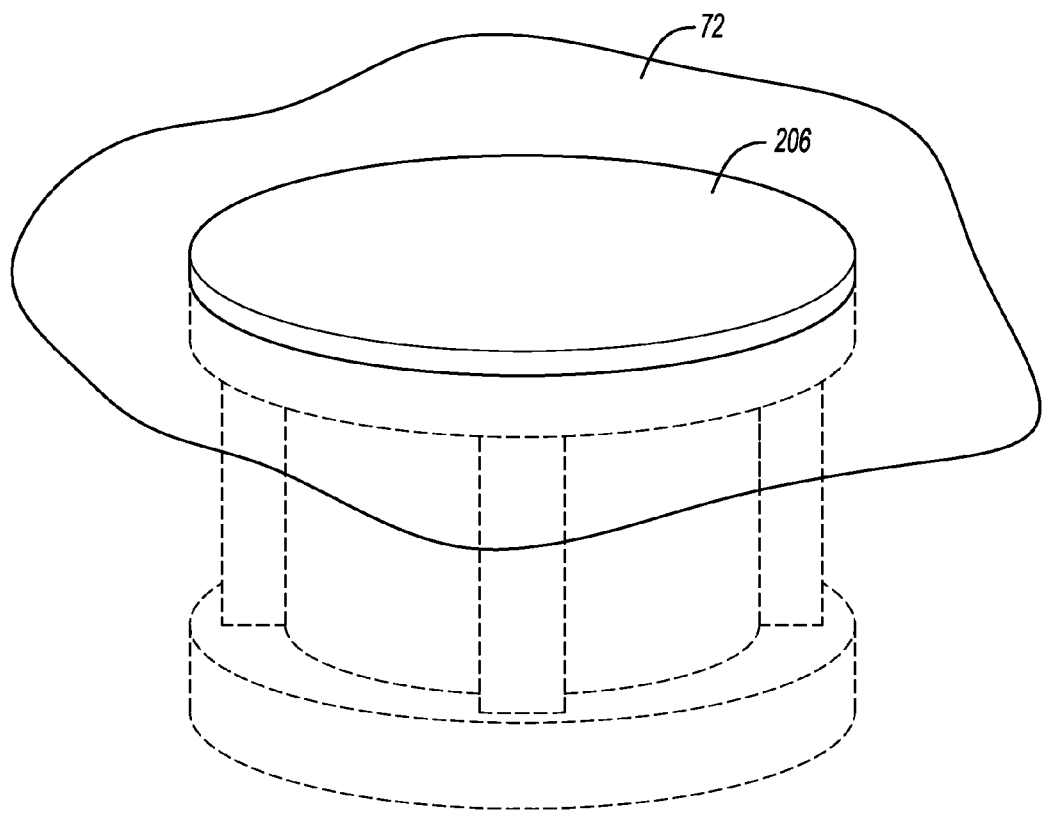
FIG. 10 shows a close-up view of an insert from the embodiment of FIG. 9 within an inner endplate.

Referring now to FIGS. 9 and 10, another example electrical joint 200 includes an insert 206, a bus bar extension 210, and a cable connector 214. In this example, rather than using a fastener like the bolt (FIG. 4), the electrical joint 200 uses a weld W to secure the bus bar extension 210 and cable connector 214 together with the insert 206. A laser weld or spot weld could be used, for example.

In the electrical joint 200, the bus bar extension 210 is sandwiched between the cable connector 214 and the insert 206 in this example. In another example, the cable connector 214 is sandwiched between the bus bar extension 210 and the insert 206.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An assembly, comprising:
   an array plate of a traction battery; and
   an insert held by the array plate and in electrical communication with a bus bar of the traction battery, the insert protruding from an array surface of the array plate to provide a contact surface spaced from the array surface, the bus bar configured to electrically communicate with the insert through the contact surface.

2. The assembly of claim 1, further comprising a fastener that engages the insert to secure a portion of the bus bar relative to the array plate.

3. The assembly of claim 2, wherein the fastener further engages the insert to secure an electric cable connector to the traction battery.

4. The assembly of claim 2, wherein the fastener threadably engages the insert.

5. The assembly of claim 1, wherein a portion of the bus bar and an electric cable connector are weldably attached to the insert.

6. The assembly of claim 1, wherein the array plate comprises a nominally non-conductive material, and the insert comprises a metallic material.

7. The assembly of claim 1, wherein the array surface is an upwardly facing surface.

8. The assembly of claim 1, wherein the insert is in-molded with the array plate.

9. The assembly of claim 1, wherein the array plate is an endplate.

10. The assembly of claim 1, wherein the bus bar in electrical communication with the insert is disposed entirely outside the array plate, wherein the insert is an inner endplate that separates an outer endplate from a plurality of battery cells, the inner endplate less electrically conductive than the outer endplate.

11. An assembly, comprising:
    an array plate of a traction battery; and
    a fastening insert having a first portion recessed within the array plate and having a second portion protruding from an outer surface of the array plate to provide a contact surface in electrical communication with a bus bar that is outside of the array plate, the fastening insert more electrically conductive than the array plate.

12. The assembly of claim 11, wherein the array plate electrically insulates the insert.

13. The assembly of claim 11, wherein the array plate is a non-conductive material.

14. The assembly of claim 11, further comprising a fastener that engages the fastening insert to secure an electrical cable to the bus bar of the traction battery.

15. The assembly of claim 14, wherein the fastener clamps the electric cable and a flange of the bus bar against the contact surface, the flange and the electrical cable both disposed entirely outside the array plate.

16. A method, comprising:
electrically coupling an electrical cable to a bus bar of a traction battery array by securing the electrical cable relative to an insert that is held within an array plate such that a portion of the insert protrudes from a surface of the array plate, the bus bar outside of the array plate.

17. The method of claim 16, further comprising engaging a fastener with the insert to secure the electrical cable relative to the traction battery array.

18. The method of claim 17, wherein the insert provides a bore disposed along an axis, the bore to receive the fastener such that the insert threadably engages the fastener, and further comprising limiting rotation of the insert relative to the array plate during the engaging by contacting a radially extending flange of the insert against a portion of the array plate.

19. The method of claim 16, wherein the insert is conductive and the array plate is nominally non-conductive.

20. The method of claim 16, wherein the insert protrudes from an outwardly facing surface of the array plate, such that the electrically coupling between the contact surface of the insert, the bus bar, and the electrical cable occurs at a position that is based from the outwardly facing surface.

* * * * *

UNITED STATES PATENT AND TRADEMARK OFFICE
CERTIFICATE OF CORRECTION

PATENT NO. : 9,559,346 B2  
APPLICATION NO. : 14/736403  
DATED : January 31, 2017  
INVENTOR(S) : Josef Dollison et al.

It is certified that error appears in the above-identified patent and that said Letters Patent is hereby corrected as shown below:

On the Title Page

Item (72), delete "L1vonia" and insert --Livonia--.

Item (72), delete "Desrborn" and insert --Dearborn--.

Signed and Sealed this
Sixteenth Day of May, 2017

Michelle K. Lee
*Director of the United States Patent and Trademark Office*